US008558526B2

(12) United States Patent
Ishii

(10) Patent No.: US 8,558,526 B2
(45) Date of Patent: Oct. 15, 2013

(54) DC-DC CONVERTER HAVING A BOOTSTRAP CIRCUIT

(75) Inventor: Takuya Ishii, Osaka (JP)

(73) Assignee: Panasonic Corporation, Osaka (JP)

(*) Notice: Subject to any disclaimer, the term of this patent is extended or adjusted under 35 U.S.C. 154(b) by 168 days.

(21) Appl. No.: 13/044,284

(22) Filed: Mar. 9, 2011

(65) Prior Publication Data

US 2011/0156669 A1  Jun. 30, 2011

Related U.S. Application Data

(63) Continuation of application No. PCT/JP2010/004481, filed on Jul. 9, 2010.

(30) Foreign Application Priority Data

Nov. 4, 2009 (JP) ................................. 2009-252874

(51) Int. Cl.
G05F 1/00 (2006.01)

(52) U.S. Cl.
USPC .......................................... 323/283; 323/284

(58) Field of Classification Search
USPC ................................. 323/283, 284
See application file for complete search history.

(56) References Cited

U.S. PATENT DOCUMENTS 6,346,801 B1* 2/2002 Zafarana et al. ............... 323/284
6,396,251 B2* 5/2002 Corva et al. .................... 323/283
2004/0070382 A1* 4/2004 Walters et al. ................. 323/284
2005/0030777 A1 2/2005 Dogome et al.
2007/0182390 A1 8/2007 Ishii et al.
2009/0146631 A1* 6/2009 Fukumori ....................... 323/284
2011/0115456 A1* 5/2011 Tanifuji et al. ................. 323/283

FOREIGN PATENT DOCUMENTS

| JP | 10-056776 | 2/1998 |
| JP | 2004-304527 | 10/2004 |
| JP | 2005-065393 | 3/2005 |
| JP | 2007-028797 | 2/2007 |
| JP | 2007-195361 | 8/2007 |
| JP | 2007-215259 | 8/2007 |
| JP | 2010-200554 | 9/2010 |

* cited by examiner

Primary Examiner — Adolf Berhane
Assistant Examiner — Gary Nash
(74) Attorney, Agent, or Firm — McDermott Will & Emery LLP

(57) ABSTRACT

A DC-DC converter includes a bootstrap circuit including a capacitor which is configured to be charged when a low-side switch is an on-state, and being configured to pull up an on-drive voltage of the high-side switch by a charged voltage of the capacitor, a control circuit configured to perform switching control of the high-side switch and the low-side switch, and a predetermined-time trigger circuit configured to cause an output to be active for a predetermined time, when a break signal for instructing switching control of the high-side switch and the low-side switch to be halted is inactive. The control circuit performs switching control to turn the high-side switch off and the low-side switch on, when the output of the predetermined-time trigger circuit is active.

4 Claims, 6 Drawing Sheets

DC-DC CONVERTER HAVING A BOOTSTRAP CIRCUIT

CROSS-REFERENCE TO RELATED APPLICATION

This is a continuation of PCT International Application PCT/JP2010/004481 filed on Jul. 9, 2010, which claims priority to Japanese Patent Application No. 2009-252874 filed on Nov. 4, 2009. The disclosures of these applications including the specifications, the drawings, and the claims are hereby incorporated by reference in their entirety.

BACKGROUND

The present disclosure relates to a DC-DC converter, and more particularly, relates to bootstrapping of an on-drive voltage of a high-side switch in a DC-DC converter.

As DC power sources for various electronic equipments, switching-type DC-DC converters have been widely used. In general, in a DC-DC converter, switching control is performed to a high-side switch and a low-side switch which are connected in series between an input voltage and the ground, and electric energy stored in an inductor is smoothed by a smoothing capacitor, thus generating an output voltage.

There are cases where the high-side switch is comprised of an n-channel MOSFET for the purpose of reducing the size and improving the performance of the DC-DC converter. In such a case, a bootstrap circuit is provided, since an on-drive voltage of the high-side switch has to be equal to or higher than an input voltage. The bootstrap circuit includes a capacitor connected to a connection point of the high-side switch and the low-side switch, and the on-drive voltage of the high-side switch is pulled up by a charged voltage of the capacitor.

In general, a diode is provided between the capacitor and a power supply so that the charge of the capacitor does not flow in a reverse direction towards the power supply during bootstrapping of the on-drive voltage of the high-side switch. Configurations in which a switching transistor whose voltage drop is small is provided, instead of the diode, to prevent reduction in charging voltage of the capacitor have been known (see, e.g., Japanese Patent Publication No. 2007-195361).

SUMMARY

For the bootstrap circuit to pull up the on-drive voltage of the high-side switch to a level equal to or higher than the input voltage, the low-side switch has to be maintained to be in an on-state for a certain period so that the capacitor has to be sufficiently charged. However, when a switching operation of the DC-DC converter is halted for a long time, for example, during a standby mode, during a halt mode after detection of an overvoltage, etc., the capacitor is discharged, so that the on-drive voltage of the high-side switch cannot be sufficiently pulled up. As a result, even when an on-control of the high-side switch is performed at a restart of an operation, the high-side switch might not be turned on, so that the DC-DC converter cannot be smoothly restarted.

A DC-DC converter according to one example embodiment of the present invention may be advantageous when it is desired to cause a DC-DC converter to recover from a long switching halt state to a normal state.

For example, an example DC-DC converter configured to step down an input voltage to generate an output voltage by switching control of a high-side switch and a low-side switch connected in series between the input voltage and a ground includes: a bootstrap circuit including a capacitor which is configured to be charged when the low-side switch is in an on-state, and being configured to pull up an on-drive voltage of the high-side switch by a charged voltage of the capacitor, a control circuit configured to perform switching control of the high-side switch and the low-side switch; and a predetermined-time trigger circuit configured to cause an output to be active for a predetermined time, when a break signal for instructing switching control of the high-side switch and the low-side switch to be halted becomes inactive. The control circuit performs switching control to turn the high-side switch off and the low-side switch on, when the output of the predetermined-time trigger circuit is active.

Thus, during the time from the time when a halt state is over to the time when the high-side switch is controlled to be on, the capacitor in the bootstrap circuit is continuously being charged. Therefore, even if the halt state continues for a long time and the capacitor is discharged during the halt state, the high-side switch can be turned on at a restart of an operation. Therefore, the DC-DC converter can smoothly recover from the halt state to a normal state.

DETAILED DESCRIPTION

First Embodiment

Figure 1:
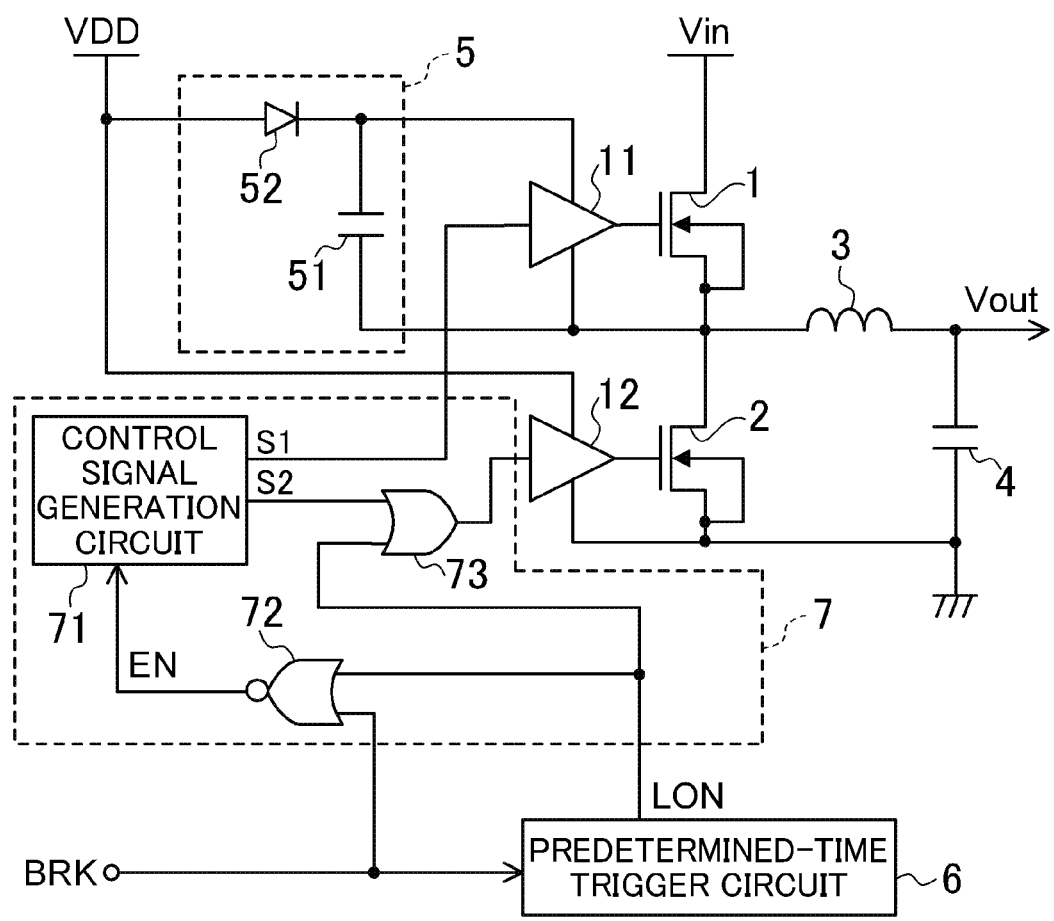
FIG. 1 is a block diagram of a DC-DC converter according to a first embodiment.

FIG. 1 illustrates a configuration of a DC-DC converter according to a first embodiment. A high-side switch 1 and a low-side switch 2 are connected in series between an input voltage Vin and the ground. Each of the high-side and low-side switches is comprised of an n-channel MOSFET, and the switches are respectively driven by drivers 11 and 12. A first end of an inductor 3 is connected to a connection point of the switches. A smoothing capacitor 4 is connected between a second end of the inductor 3 and the ground. The switches are alternatively caused to be conductive with a predetermined duty ratio, and electric energy stored in the inductor 3 is smoothed by the smoothing capacitor 4, thus generating an output voltage Vout.

A bootstrap circuit 5 can be configured of a capacitor 51 and a diode 52. The capacitor 51 is charged by the voltage VDD for control via the diode 52, when the low-side switch 2 is in an on-state. A low potential end of the capacitor 51 is connected to a source of the high-side switch 1 and a reference potential end of the driver 11. Thus, when the high-side switch 1 and the low-side switch 2 are alternately caused to be conductive with the predetermined duty ratio, the capacitor 51 is charged to about the voltage VDD, and the charge is supplied as on-drive power to drive the high-side switch 1 on.

On the other hand, the voltage VDD is supplied to the driver 12, and the low-side switch 2 is driven on by the voltage VDD.

When a break signal BRK becomes inactive, a predetermined-time trigger circuit 6 drives a signal LON, as an output thereof, active for a predetermined time. The break signal BRK is a signal for instructing switching control of the high-side switch 1 and the low-side switch 2 to be halted. For example, when an output voltage Vout has reached an upper limit of an acceptable range, the break signal BRK becomes active, and when the output voltage Vout has reached a lower limit of an acceptable range, the break signal BRK becomes inactive. For convenience, an active state of each signal will be denoted as "H," and an inactive state thereof will be denoted as "L" below.

Figure 2:
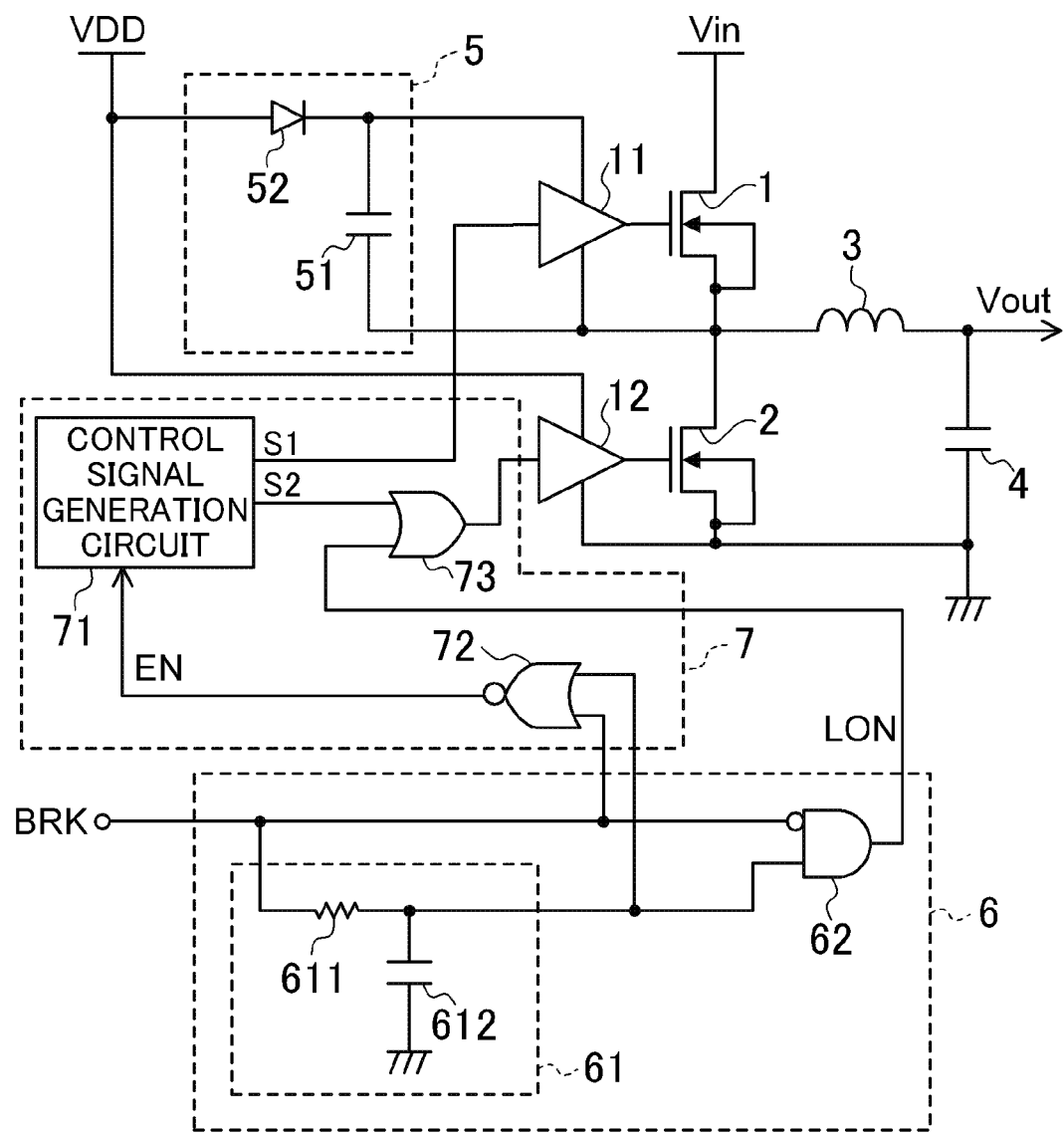
FIG. 2 is a block diagram of the DC-DC converter of FIG. 1 illustrating an example configuration of a predetermined-time trigger circuit.

FIG. 2 illustrates an example configuration of the predetermined-time trigger circuit 6. The predetermined-time trigger circuit 6 can be comprised of a delay circuit 61 configured to receive the break signal BRK and output the received signal with a delay, and a logic circuit 62 configured to perform a logical AND operation on an inversion of the break signal BRK and an output signal of the delay circuit 61. The delay circuit 61 can be realized by a CR circuit comprised of a resistor element 611 and a capacitor 612. In this case, a CR time constant is a delay time. Therefore, the delay time can be adjusted by changing at least one of respective element values of the resistor element 611 and the capacitor 612. Note that, instead of the delay circuit 61, a timer circuit configured to count a constant time may be provided.

Returning to FIG. 1, a control circuit 7 performs switching control of the high-side switch 1 and the low-side switch 2 respectively via the driver 11 and the driver 12. Specifically, when an enable signal EN is active, a control signal generation circuit 71 operates and outputs a control signal S1 for controlling the high-side switch 1 and a control signal S2 for controlling the low-side switch 2. The enable signal EN is active, when the break signal BRK is inactive and an output of the predetermined-time trigger circuit 6 is inactive. Specifically, the enable signal EN can be given as an output of a logic circuit 72 configured to perform a logical NOR operation on the break signal BRK and the signal LON. The control signal S1 is input directly to the driver 11. On the other hand, an output of a logic circuit 73 configured to perform a logical OR operation on the control signal S2 and the signal LON is input to the driver 12. That is, when the control signal S2 is active or when the output of the predetermined-time trigger circuit 6 is active, the low-side switch 2 is controlled to be on. Note that, when the predetermined-time trigger circuit 6 has the configuration shown in FIG. 2, the output of the delay circuit 61, instead of the signal LON, may be input to the logic circuit 72.

Figure 3:
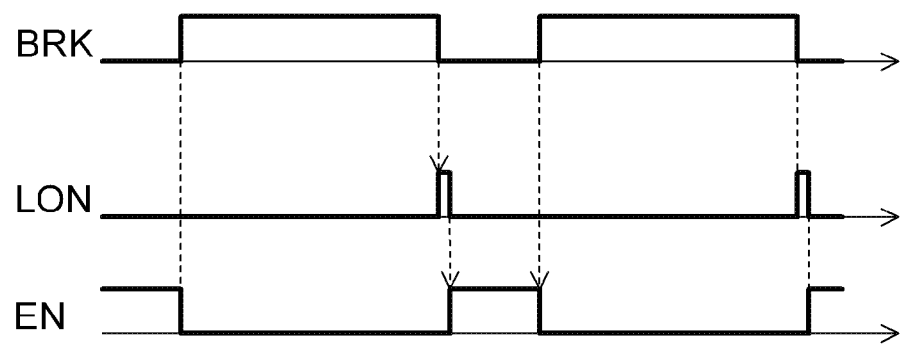
FIG. 3 is a timing chart showing the operation of the DC-DC converter of FIG. 1.

FIG. 3 shows an operation timing of the DC-DC converter of this embodiment. When a load circuit (not shown) connected to the DC-DC converter is in a standby mode and the load of the DC-DC converter is very light, the DC-DC converter might be operated intermittently to reduce power consumption. In another case, when an overshoot occurs on the output voltage Vout due to an abrupt drop of a load current, switching control might be temporarily halted until the output voltage Vout returns to a target value. During such an intermittent operation, or overvoltage detection, etc., the break signal BRK is active for a certain time. When the break signal BRK becomes "H," the enable signal EN becomes "L." Therefore, the control signal generation circuit 71 halts its operation, and each of the control signals S1 and S2 becomes "L." While the break signal BRK is "H," the signal LON remains "L."

When the halt period is over and then the break signal BRK becomes "L," the signal LON becomes "H." However, the enable signal EN remains "L," while the signal LON is "H." Thus, the control signal generation circuit 71 does not restart an operation, and therefore, the high-side switch 1 is not controlled to be on. On the other hand, since the signal LON is "H," the low-side switch 2 is controlled to be on. Therefore, the high-side switch 1 is turned off, and the low-side switch 2 is turned on, and thus, the capacitor 51, which has been discharged during the halt state, is charged.

When a predetermined time has been counted by the predetermined-time trigger circuit and the signal LON becomes "L," the enable signal EN becomes "H." Thus, the control signal generation circuit 71 restarts an operation. At this time, since the capacitor 51 is sufficiently charged, the DC-DC converter can smoothly return to a normal state.

As described above, according to this embodiment, the capacitor in the bootstrap circuit is charged at a time when a halt state is ended. Thus, an on-drive voltage of the high-side switch can be pulled up sufficiently, and the DC-DC converter can smoothly return to a normal state.

Second Embodiment

Figure 4:
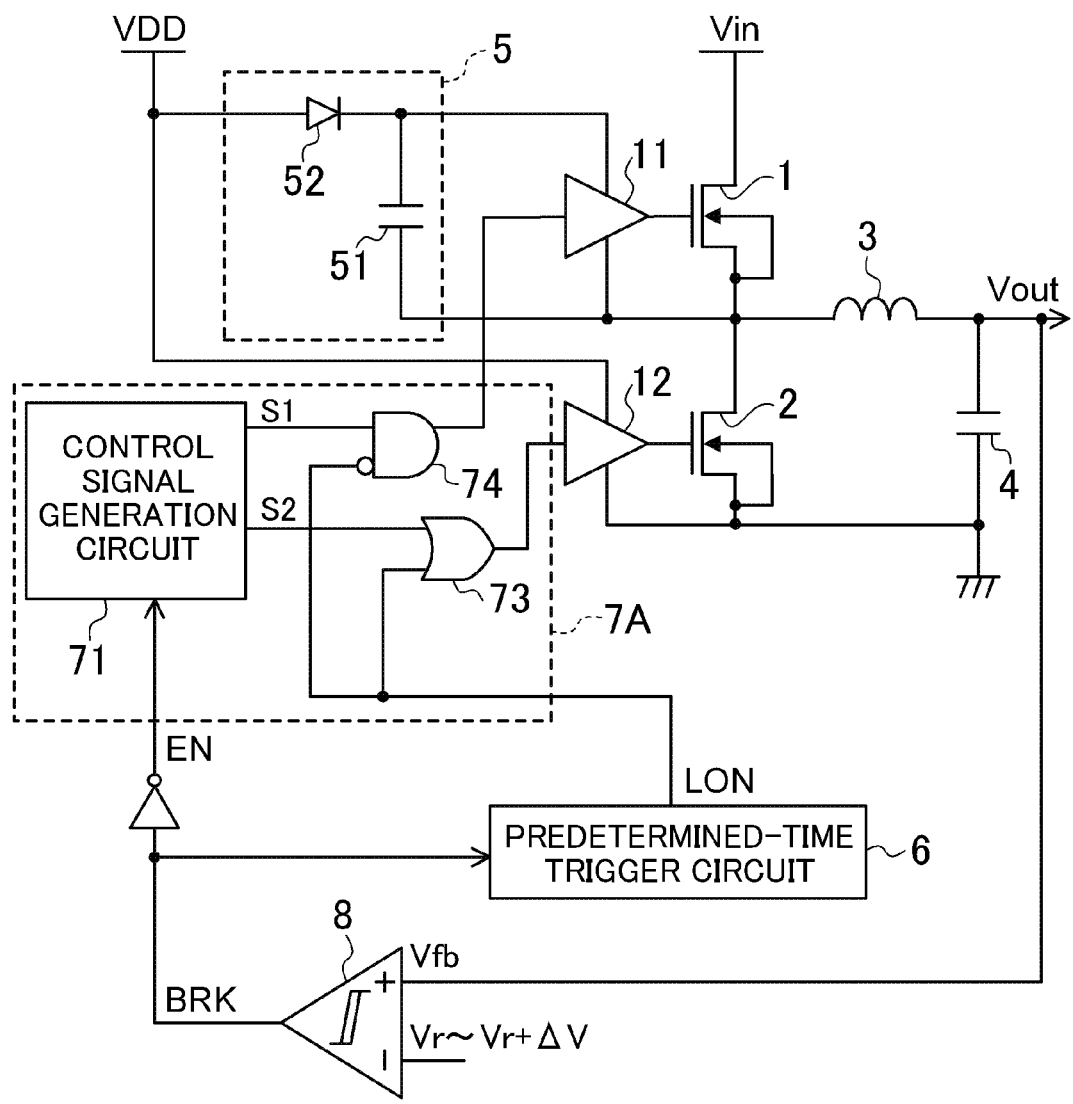
FIG. 4 is a block diagram of a DC-DC converter according to a second embodiment.

FIG. 4 illustrates a configuration of a DC-DC converter according to a second embodiment. Differences of this embodiment from the first embodiment will be described below.

The DC-DC converter of this embodiment includes a hysteresis comparator 8 configured to compare a voltage Vfb obtained by feeding back the output voltage Vout to a reference voltage Vr within a hysteresis width $\Delta V$. An output of the hysteresis comparator 8 serves as the break signal BRK. The voltage Vfb may be the output voltage Vout itself, or may be a voltage obtained by dividing the output Vout by resistors.

In a control circuit 7A, the enable signal EN to be input to the control signal generation circuit 71 is given as an inversion of the break signal BRK. Therefore, when a halt state is over, the control signal generation circuit 71 immediately starts an operation to restart one or more peripheral circuit (not shown) as well as switching control of the high-side switch 1 and the low-side switch 2. During a predetermined time since the break signal BRK has become inactive, the output of the logic circuit 73 is active due to the output of the predetermined-time trigger circuit 6, regardless of the control signal S2. Therefore, the control signal S1 has to be masked so that the high-side switch 1 and the low-side switch 2 are not turned on at the same time. Thus, an output of a logic circuit 74 configured to perform a logical AND operation on the control signal S1 and the inversion of the signal LON is input to the driver 11. That is, when the control signal S1 is active and the output of the predetermined-time trigger circuit 6 is inactive, on-control is performed to turn the high-side switch 1 on.

Figure 5:
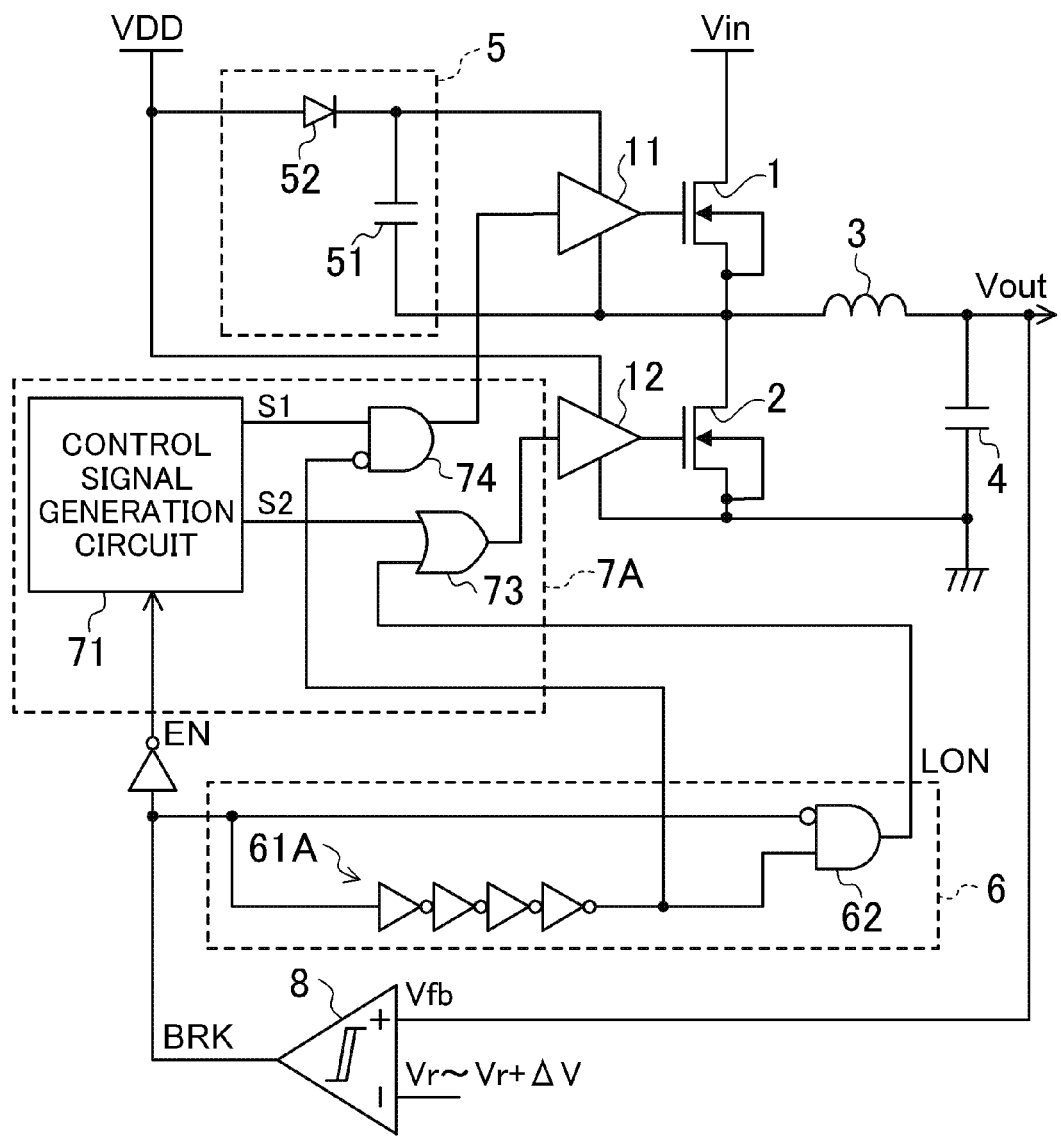
FIG. 5 is a block diagram of the DC-DC converter of FIG. 4 illustrating an example configuration of a predetermined-time trigger circuit.

FIG. 5 illustrates an example configuration of the predetermined-time trigger circuit 6. A delay circuit 61A can be realized by connecting inverter circuits in a multiple-stage configuration. The delay time can be adjusted by changing the number of stages in the multiple-stage configuration. Note that, when the predetermined-time trigger circuit 6 has the configuration of FIG. 5, an output of the delay circuit 61A, instead of the signal LON, may be input to the logic circuit 74.

Figure 6:
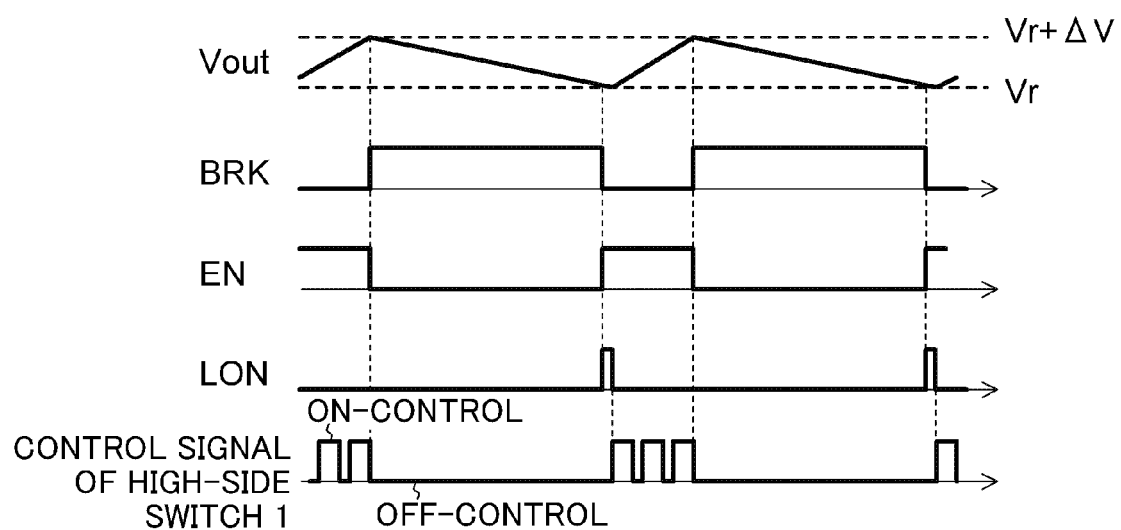
FIG. 6 is a timing chart showing the operation of the DC-DC converter of FIG. 4.

FIG. 6 shows an operation timing of the DC-DC converter of this embodiment. In a light load condition, such as an intermittent operation, a current larger than a load current is supplied to the inductor 3, and the output voltage Vout is increased. When the voltage Vfb exceeds a reference voltage Vr+ΔV, an output of the hysteresis comparator 8, i.e., the break signal BRK becomes "H." Thus, the enable signal EN becomes "L," the control signal generation circuit 71 stops the operation, each of the high-side switch 1 and the low-side switch 2 is turned off, and the output voltage Vout is reduced. During such a halt state, the operation of each of the one or more peripheral circuits (not shown) is stopped, thus resulting in reduction in the power consumption.

When the output voltage Vout is reduced and the voltage Vfb falls below the reference voltage Vr, the break signal BRK becomes "L." Thus, the enable signal EN becomes "H," and the control signal generation circuit 71 and the one or more peripheral circuits start operations. Also, since the signal LON becomes "H," the low-side switch 2 is controlled to be on. On the other hand, since the control signal S1 is masked, the high-side switch 1 remains off. Thus, the capacitor 51, which has been discharged during the halt period, is charged.

When the predetermined-time trigger circuit 6 has counted a predetermined time and the signal LON becomes "L," masking of the control signal S1 is released. Thus, the high-side switch 1 is controlled to be on. At this time, since the capacitor 51 is sufficiently charged, the DC-DC converter can smoothly return to a normal state.

As described above, according to this embodiment, each of one or more peripheral circuits can be caused to restart an operation while a capacitor in a bootstrap circuit is charged after a halt state is ended, and thus, the DC-DC converter can return to a normal state more quickly.

Note that in each of the above-described embodiments, synchronous rectification may be performed by a switching transistor, instead of the diode 52 in the bootstrap circuit 5. Also, the logic circuits 72, 73, and 74 can be configured in various configurations according to a signal logic to be input.

On-control of the high-side switch 1 does not have to be performed immediately after an output of the predetermined-time trigger circuit 6 becomes inactive. For example, a timer circuit configured to count a time longer than that of the predetermined-time trigger circuit 6 may be provided to control the high-side switch 1 to be on after counting of the timer circuit has been completed. In this case, the capacitor 51 in the bootstrap circuit 5 is charged immediately after a halt period is over, and thus, the DC-DC converter can smoothly return from the halt state to a normal state.

What is claimed is:

1. A DC-DC converter configured to step down an input voltage and to generate an output voltage by switching control of a high-side switch and a low-side switch connected in series between the input voltage and a ground, the DC-DC converter comprising:
   a bootstrap circuit including a capacitor which is configured to be charged when the low-side switch is in an on-state, and being configured to pull up an on-drive voltage of the high-side switch by a charged voltage of the capacitor;
   a control circuit configured to perform switching control of the high-side switch and the low-side switch, the control circuit being configured to receive a break signal and halt the switching control of both of the high-side switch and the low-side switch while the break signal is active; and
   a trigger circuit configured to receive the break signal and output, to the control circuit, an active signal for a period after the break signal becomes inactive, wherein:
   the control circuit performs switching control to turn the high-side switch off and the low-side switch on, when the active signal is output from the trigger circuit,
   the control circuit includes:
      a first logic circuit configured to cause an output to be active, when the break signal is inactive and an output of the trigger circuit is inactive, and otherwise, to cause the output to be inactive;
      a control signal generation circuit configured to output a first control signal for controlling the high-side switch and a second control signal, when the output of the first logic circuit is active; and
      a second logic circuit configured to cause an output to be active, when the second control signal is active or the output of the trigger circuit is active, and, otherwise, to cause the output to be inactive, and
   the high-side switch and the low-side switch perform switching operations according to the first control signal and the output of the second logic circuit, respectively.

2. A DC-DC converter configured to step down an input voltage and to generate an output voltage by switching control of a high-side switch and a low-side switch connected in series between the input voltage and a ground, the DC-DC converter comprising:
   a bootstrap circuit including a capacitor which is configured to be charged when the low-side switch is in an on-state, and being configured to pull up an on-drive voltage of the high-side switch by a charged voltage of the capacitor;
   a control circuit configured to perform switching control of the high-side switch and the low-side switch, the control circuit being configured to receive a break signal and halt the switching control of both of the high-side switch and the low-side switch while the break signal is active; and
   a trigger circuit configured to receive the break signal and output, to the control circuit, an active signal for a period after the break signal becomes inactive, wherein;
   the control circuit performs switching control to turn the high-side switch off and the low-side switch on, when the active signal is output from the trigger circuit,
   the control circuit includes:
      a control signal generation circuit configured to output a first control signal and a second control signal, when the break signal is inactive;
      a first logic circuit configured to cause an output to be active, when the first control signal is active and an output of the trigger circuit is inactive, and otherwise, to cause the output to be inactive; and
      a second logic circuit configured to cause an output to be active, when the second control signal is active or the output of the trigger circuit is active, and otherwise, to cause the output to be inactive, and
   the high-side switch and the low-side switch perform switching operations according to the outputs of the first logic circuit and the second logic circuit, respectively.

3. A DC-DC converter configured to step down an input voltage and to generate an output voltage by switching control of a high-side switch and a low-side switch connected in series between the input voltage and a ground, the DC-DC converter comprising:
   a bootstrap circuit including a capacitor which is configured to be charged when the low-side switch is in an on-state, and being configured to pull up an on-drive voltage of the high-side switch by a charged voltage of the capacitor;
   a control circuit configured to perform switching control of the high-side switch and the low-side switch, the control circuit being configured to receive a break signal and halt the switching control of both of the high-side switch and the low-side switch while the break signal is active; and a trigger circuit configured to receive the break signal and output, to the control circuit, an active signal for a period after the break signal becomes inactive, wherein:

the control circuit performs switching control to turn the high-side switch off and the low-side switch on, when the active signal is output from the trigger circuit, and the trigger circuit includes:

a delay circuit configured to receive the break signal and output the received break signal with a delay; and a logic circuit configured to perform a logical operation on the break signal and an output of the delay circuit.

4. A DC-DC converter configured to step down an input voltage to generate an output voltage by switching control of a high-side switch and a low-side switch connected in series between the input voltage and a ground, the DC-DC converter comprising:

a bootstrap circuit including a capacitor which is configured to be charged when the low-side switch is in an on-state, and being configured to pull up an on-drive voltage of the high-side switch by a charged voltage of the capacitor;

a control circuit configured to perform switching control of the high-side switch and the low-side switch;

a trigger circuit configured to cause an output to be active for a predetermined period, when a break signal for instructing switching control of the high-side switch and the low-side switch to be halted becomes inactive; and a hysteresis comparator configured to compare a voltage obtained by feeding back the output voltage to a target voltage and output the break signal as a result of the comparison, wherein the control circuit performs switching control to turn the high-side switch off and the low-side switch on, when the output of the trigger circuit is active.

* * * * *